US011622002B2

(12) United States Patent
Castelli et al.

(10) Patent No.: US 11,622,002 B2
(45) Date of Patent: Apr. 4, 2023

(54) SYNCHRONIZING VIRTUAL REALITY NOTIFICATIONS

(71) Applicant: International Business Machines Corporation, Armonk, NY (US)

(72) Inventors: Vittorio Castelli, Croton-on-Hudson, NY (US); Sarbajit K. Rakshit, Kolkata (IN); Martin Franz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 17/149,055

(22) Filed: Jan. 14, 2021

(65) Prior Publication Data
US 2022/0224584 A1      Jul. 14, 2022

(51) Int. Cl.
*H04L 67/1095*     (2022.01)
*G06F 40/205*     (2020.01)
(Continued)

(52) U.S. Cl.
CPC ........ *H04L 67/1095* (2013.01); *G02B 27/017* (2013.01); *G06F 40/205* (2020.01); *G06F 40/30* (2020.01); *H04L 67/131* (2022.05)

(58) Field of Classification Search
CPC ..... H04L 29/0854; H04L 67/38; G06F 40/30; G06F 40/205; G06F 3/011; G06F 3/0482;
(Continued)

(56) References Cited

U.S. PATENT DOCUMENTS

2007/0265091 A1\* 11/2007 Aguilar, Jr. ......... G07F 17/3227
                                                                  463/42
2009/0287640 A1   11/2009 Hamilton, II
(Continued)

FOREIGN PATENT DOCUMENTS

WO        2019118367 A1     6/2019

OTHER PUBLICATIONS

Gardonio, Scottie, "Augmented and Virtual Reality Shopping—Retailers Beware", IoT For All, Aug. 12, 2017, 12 Pages.
(Continued)

*Primary Examiner* — Caroline H Jahnige
(74) *Attorney, Agent, or Firm* — Stephen R. Yoder (57) ABSTRACT

In an approach to synchronize notifications created in a VR environment to be presented in a physical environment at another time, notifications may be mapped across all relevant environments and associated with conditions that, when triggered, cause a notification to be presented to the user. Computer-implemented methods may include receiving natural language requests at a computing device in a first environment at a first time; parsing the natural language request into semantic components comprising an alert component and a content component; determining one or more conditions based on the alert component and the content component; mapping the semantic components to the plurality of environments; and executing a notification by the computing device, the notification representing the alert component and the content component in a second environment of the plurality of environments if the one or more conditions is satisfied at a second time that is later than the first time.

17 Claims, 4 Drawing Sheets

(51) Int. Cl.
*G06F 40/30* (2020.01)
*H04L 67/131* (2022.01)
*G02B 27/01* (2006.01)

(58) Field of Classification Search
CPC .. G06F 3/0304; G06F 16/90332; G06F 40/20; G06Q 10/109; H04W 4/029; H04W 4/02; H04W 4/021; G02B 27/017
See application file for complete search history.

(56) References Cited

U.S. PATENT DOCUMENTS

| | | |
|---|---|---|
| 2009/0319668 A1 | 12/2009 | Hamilton, II |
| 2010/0106782 A1 | 4/2010 | Huang |
| 2012/0265535 A1 | 10/2012 | Bryant-Rich |
| 2013/0275523 A1 | 10/2013 | Jang |
| 2014/0160157 A1* | 6/2014 | Poulos ................. G06Q 10/109 345/633 |
| 2014/0206391 A1 | 7/2014 | Perotti |
| 2015/0200892 A1* | 7/2015 | Ramachandran .... G06Q 10/109 707/758 |
| 2015/0370884 A1 | 12/2015 | Hurley |
| 2016/0012709 A1* | 1/2016 | Luna ...................... G08B 21/24 340/286.01 |
| 2017/0004396 A1* | 1/2017 | Ghotbi ................ G06F 3/04842 |
| 2017/0083179 A1* | 3/2017 | Gruber .................... H04L 51/04 |
| 2018/0068453 A1 | 3/2018 | Bostick |
| 2018/0232056 A1 | 8/2018 | Nigam |
| 2019/0095846 A1* | 3/2019 | Gupta ............ G06Q 10/063114 |
| 2019/0122526 A1 | 4/2019 | Agnihotri |

OTHER PUBLICATIONS

Hsieh et al., "Bridging the Virtual and Real Worlds: A Preliminary Study of Messaging Notifications in Virtual Reality", CHI 2020 Paper, Honolulu, HI, USA, Apr. 25-30, 2020, 14 Pages.

Lu et al., "Look-up and Adapt: A One-shot Semantic Parser", arXiv:1910.12197v1 [cs.CL], Oct. 27, 2019, 15 Pages.

Rzayev et al., "Notification in VR: The Effect of Notification Placement, Task, and Environment", Paper Session 3: Dissecting the Player Experience, CHI PLAY'19, Barcelona, Spain, Oct. 22-25, 2019, 13 Pages.

Zenner et al., "Immersive Notification Framework:Adaptive & Plausible Notifications in Virtual Reality", CHI'18 Extended Abstracts, Montreal, QC, Canada, Apr. 21-26, 2018, 6 Pages.

\* cited by examiner

SYNCHRONIZING VIRTUAL REALITY NOTIFICATIONS

BACKGROUND OF THE INVENTION

The present invention relates generally to the field of virtual reality, and more particularly to synchronizing notifications across virtual reality environments and physical environments.

Interacting within a Virtual Reality (VR) environment can be achieved using head mounted displays and other interface devices and can be used in a broadening array of applications. A user equipped with a wearable VR device may be visually immersed in a VR world or a VR environment that is completely virtual or a combination of virtual and physical. VR devices and environments are applied in work, shopping, gaming, virtual travel, and other forms of entertainment, etc. While using a VR device to access a specific VR environment, a user is partially or completely disconnected from the physical world. Also, in most cases, the user is completely disconnected from other VR environments that the user may have access to at other times. As the user navigates through a VR environment, various VR features may be available or not available. For example, a user may perform a task in one VR environment that cannot be performed in another VR environment. This is of the disadvantages faced by users who would like to perform tasks in one environment and have those tasks translate to an action or event in another environment. Currently, another disadvantage is that a user may have various ways to create a notification (e.g., alert) specific to the user's current environment (e.g., virtual or physical), but the user cannot create or modify a notification that would be valid in the other environments that the user may access or visit at another time. Disjointed VR environments presents challenges to users who have a desire for synchronizing multiple VR environments with tasks and events created in one VR environment.

SUMMARY

Embodiments of the present invention disclose a computer-implemented method, a computer program product, and a system for synchronizing notifications across virtual reality environments and physical environments. The computer-implemented method for synchronizing notifications between virtual reality environments and physical environments may include one or more processors configured for receiving a natural language request at a computing device operating within a first environment of a plurality of environments at a first time, where the plurality of environments each comprise one or more parameters and the plurality of environments are accessible by a user associated with the computing device; parsing the natural language request into semantic components comprising an alert component and a content component; determining one or more conditions based on the alert component and the content component; mapping the semantic components to the plurality of environments; and executing a notification by the computing device, the notification representing the alert component and the content component in a second environment of the plurality of environments if the one or more conditions is satisfied at a second time that is later than the first time.

As a solution, synchronizing multiple VR environments so that alerts or notifications created in one environment is triggered in another VR environment upon the satisfaction of certain conditions provides advantages to the challenges faced in the prior art. Such advantages allow users to be immersed within the entire realm of the VR landscape, where they can create events or notifications in one VR environment, travel to another VR environment, and have the events or notifications apply there as well. Since the events or notifications are synchronized throughout all applicable VR environments, conditions associated with the events or notifications may be triggered in the appropriate VR environment where the user must take the associated action or receive the associated set of information that was determined at the time the event or notification was created.

As a further advantage, the computer-implemented method may further include converting the natural language request to text data using semantic analysis. The computer-implemented method may further preferably include identifying the alert component in the natural language request as a device command instructing the computing device to generate the notification. The computer-implemented method may further include, as another advantage, identifying the content component in the natural language request as a user command instructing a user to perform a task. Preferably, the one or more conditions may include one or more of a geographical condition corresponding to a location, an activity condition corresponding to a user event, and a user condition determined based on the content component. As an advantage, the first environment may be a virtual reality environment and the second environment may be a physical environment, or vice versa. Preferably, the notification may be one or more of an audible alert and a visual alert representing the content component and is presented to the user via VR goggles communicably coupled with the computing device.

DETAILED DESCRIPTION

The embodiments described herein provide a computer-implemented method, computer systems, and computer program products by which a user can create an alert or notification in a physical world or in multiple VR environments (e.g., work, shopping, gaming, or other forms of human activity). Embodiments of the present invention recognize that alerts entered in one environment may be most useful when presented in another environment, whether physical or virtual. The alert may be synchronized between two or more of the environments including the physical world and the VR world. The alert may be presented based on conditions specified at the time of the alert creation or at a later time. The user or other users may be notified about the alert during their activity in any of the environments, depending on the conditions specified as part of the alert properties.

While using a VR device to access a specific VR environment, a user is partially or completely disconnected from the physical world, and also, in most cases, completely disconnected from the other VR environments the user might be using at different times. The user may employ various methods for creating the notification (e.g., alert) specific to the user's current environment (e.g., physical environment or virtual environment), but the user may not be able to create or modify a notification valid in the environments the user visits at different times. For example, at a first time, a user may be in using a VR device in a VR environment, wherein the user creates a notification to be reminded to perform a task upon the satisfaction of one or more conditions (e.g. at a specific time, at a specific location, upon observing a particular item), but the user may not be able to create the notification in another environment because the user is not in that environment or does not have access to that environment. Thus, the user created notification in the VR environment may be presented to the user in the other environment upon satisfaction of the one or more conditions established when the notification was created.

In an embodiment, the computer-implemented method may include one or more processors configured to receive user inputs via a user interface of a user device associated with a user, wherein the user inputs may be processed to create or modify a notification (e.g., alert) in any of the physical or virtual environments in which the user device is present. The notification (e.g., alert) may then be synchronized among all the environments and applied according to the conditions specified or determined at the time when the notification was created or thereafter.

Synchronizing multiple VR environments so that alerts or notifications created in one environment is triggered in another VR environment upon the satisfaction of certain conditions provides advantages to the challenges faced in the prior art. Such advantages allow user immersion within the entire realm of the VR landscape, where the user can create events or notifications in one VR environment, travel to another VR environment, and have the events or notifications apply there as well. Since the events or notifications are synchronized throughout all applicable VR environments, conditions associated with the events or notifications may be triggered in the appropriate VR environment where the user is recommended to take the associated action or receive the associated set of information that was determined at the time the event or notification was created.

In an embodiment, the computer-implemented method may include one or more processors configured to detect a user device associated with a user that is interacting within a VR environment. While interacting within the VR environment, a user interface may be generated and configured to receive user inputs to create one or more notifications (e.g., alerts) based on one or more selected conditions within the VR environment. The one or more processors may be configured to apply the notifications according to the conditions specified or determined at the time the notification was created, or at a later time while the user is either accessing a different VR environment, or in a physical environment.

In an embodiment, the computer-implemented method may include one or more processors configured to receive user inputs to create one or more notifications (e.g., alerts) based on one or more selected conditions within a physical environment, wherein the notification may be presented to be detected by the user when the user is detected within one or more specific VR environments and the one or more selected conditions are satisfied while in one or more of the specific VR environments.

In an embodiment, the user inputs may correspond to instructions to create notifications for the user to receive or for other users to receive. In other words, the one or more processors may be configured to receive user inputs from a first user to create one or more notifications to be presented to a second user if the one or more conditions are satisfied while the second user is detected in a specific VR environment or a specific physical environment. User input to create the notification may be done via text entry, graphical user interface (GUI), speech-to-text, text-to-speech, or any other user data entry method as known to those of skill in the art.

In an embodiment, the one or more processors may be configured to consider multiple factors when creating the notification and associating the specified conditions to trigger the notification. For example, environment location (e.g., VR or physical), geo-fencing area, time, contextual situation, etc. may be considered when mapping or synchronizing the notifications and associated conditions to the one or more environments. Other VR environment parameters and physical environment parameters may be considered or embedded within the one or more environments to be used in determining whether or not to present the notification to the intended user. In an embodiment, the notification parameters (e.g., user location, user behavior, and/or timing information) may be continuously considered and compared to the notification parameters to determine if the conditions are satisfied to present the notification to the intended user. In an embodiment, notification parameters may also include the location and/or behavior of other users (e.g., users other than the user responsible for creating the notification) in determining when to present the notification to the intended user while in the environment (e.g., VR environment and/or physical environment).

By considering multiple factors when creating the notification and associating the specified conditions to trigger the notification, embodiments described herein allow numerous customizations to be applied to each notification. Further, it is advantageous to synchronize the notifications across each applicable VR environment so that user may freely navigate throughout their domains and still be presented with the appropriate notification once the conditions are satisfied.

In an embodiment, the one or more processors may be configured to receive inputs from a user to create notifications by receiving parameter inputs corresponding to conditions for presenting the notification. For example, a condition for presenting the notification may include determining if the user is within an environment corresponding to a store type or a specific geo-location, and then presenting the notification to the user. Another example of a condition for presenting the notification may include determining if a certain amount of time has elapsed, then presenting the notification to the user. Multiple conditions may be established to trigger presenting the notification to the user.

In an embodiment, the notification may be in any form that is perceptible to the user. For example, the notification may include an acoustic alert, a visual alert, a tactile alert, a message alert, or any combination thereof. The notification may include specifications corresponding to multiple actions to be performed by one or more of the user devices associated with the user. Further, the notification may include specifications corresponding to multiple actions to be performed by one or more user devices not associated with the user (e.g., a second user device associated with a first user device).

In an embodiment, a first user may set a notification with a condition on a first user device, that when satisfied, may include a second user device presenting a notification to a second user. For example, the notification set by the first user may trigger a notification to be presented by a second user device to a second user to place a phone call or send a text message. A notification may also include parameters or instructions about which environment to present the notification. For example, a user may provide a condition to only present the notification to the user or another user if the user or other user is in a specific environment determined by detecting the geo-location of the intended user. Notification parameters may also include information about which specific users should receive the notification based on those users' permissions, which environment in which to receive the notification, and timing parameters in which the notification should be presented.

In an embodiment, the computer-implemented method may include one or more processors configured to receive user inputs to create one or more notifications (e.g., alerts) based on one or more selected conditions when not within a physical environment, wherein the notification may be presented when the user is not detected or is detected within a specific VR environment and the one or more selected conditions are satisfied even while not in a specific VR environment or within a specific VR environment. The plurality of environments may each comprise one or more parameters and the plurality of environments may be accessible by a user associated with the computing device.

In an embodiment, the computer-implemented method may include one or more processors configured to synchronize (e.g., map) the one or more notifications within one or more environments (e.g., VR environment, physical environment) based on the one or more conditions specified by the user or determined by the one or more processors.

Once the one or more notifications are synchronized or successfully mapped to the one or more environments, the one or more processors may be configured to determine if a user is detected in the one or more environments and present the one or more notifications to the intended user if the one or more conditions associated with the one or more notifications is satisfied.

In an embodiment, a user associated with one or more user devices (e.g., smartphone, VR goggles, etc.) may be in a store browsing products while wearing the one or more user devices (e.g., VR goggles coupled with a smartphone). As the user is navigating content in the store, the system may be configured to detect the user purchasing a first product and looking at a second product. The one or more processors may be configured to analyze the user's shopping behavior (e.g., purchasing the first product and looking at the second product) and create a notification to alert the user about the second product based on one or more conditions that may be set by the user or determined by the one or more processors based on the one or more environment parameters corresponding to the current user environment and/or a later user environment.

In another embodiment, the computer-implemented method may include one or more processors configured for executing instructions on a computing device (e.g., user device) to maintain a mapping between a physical environment and a virtual environment by analyzing the contextual parameters and situation in the physical environment and the VR environment. For example, while a user is navigating a VR environment equipped with a VR user device, the VR user device may be configured to analyze VR content present in the VR environment to identify a virtual geo-location (e.g., virtual coordinates) of the user. Further, while a user is navigating a VR environment equipped with a VR user device, the VR device may be configured to identify virtual context location of the user, such as a shopping center, train station, or other points of interest and accessible to the user. Further, while a user is navigating a VR environment equipped with a VR user device, the VR device may be configured to identify or detect the presence of other users present in the physical or VR environment.

In the example where the VR device is configured to detect the presence of other users present in the VR environment, the one or more processors may be configured to process the other users' presence to determine if a condition to trigger an alert is present. For example, an alert may have been created to "remind me to say Happy Birthday to Trayvon" while the user is in a first environment. Then, once the VR device detects the presence of Trayvon in another environment using sensors of the VR device, the one or more processors may be configured to present the notification to the user that relays the message "say Happy Birthday to Trayvon". The notification may be presented as an audio message played from speakers connected to the VR device, as a text message displayed so the user can visually view it, or as a unique haptic notification to indicate the alert to view or receive.

In an embodiment, the one or more processors may be configured to identify the virtual geo-fencing area using contextual analysis of the VR contents present in the VR environment. In performing a contextual analysis of the VR content, the one or more processors may be configured to process data corresponding to time, weather, user activity, user response, and environment parameters (e.g., VR environment parameters and/or physical environment parameters) such as geo-location, timing, etc. Multiple factors (e.g., time, weather, user activity, user response, and/or environment parameters) may be combined from physical and VR environments in performing a contextual analysis to generate a notification. For example, a VR user device may be activated and in use by a user to participate on a tour having one or more tour paths, where the VR user device is configured to execute instructions corresponding to a tour guide operator for a particular path. During the tour on a first path, the VR user device may determine that it is at a first location (e.g., a first photo stop on a path in a national park) based on location data. Further, VR user device may be configured to determine the weather condition (e.g., visibility, precipitation, and/or temperature) based on weather data. Further, VR user device may be configured to determine time data (e.g., time of day) and use the time data to determine what time of day is suitable for participating in the tour. Further, VR user device may determine that a chosen time of day is not suitable for participating in the tour and provide a first notification to be detected by the user to make a detour from the first tour path to a second tour path. Multiple notifications may be provided to be detected to the user of the VR user device. For example, in addition to the first notification, the VR user device may be configured to provide a second notification to provide information that may be relevant to the user. The second notification may include information to tell the user to "Enjoy the View!" Further, the notifications may include alternative messaging (e.g., detour to a different path OR continue on the current path) for the user to receive and make a decision.

Implementation of embodiments of the invention may take a variety of forms, and exemplary implementation details are discussed subsequently with reference to the Figures.

Figure 1:
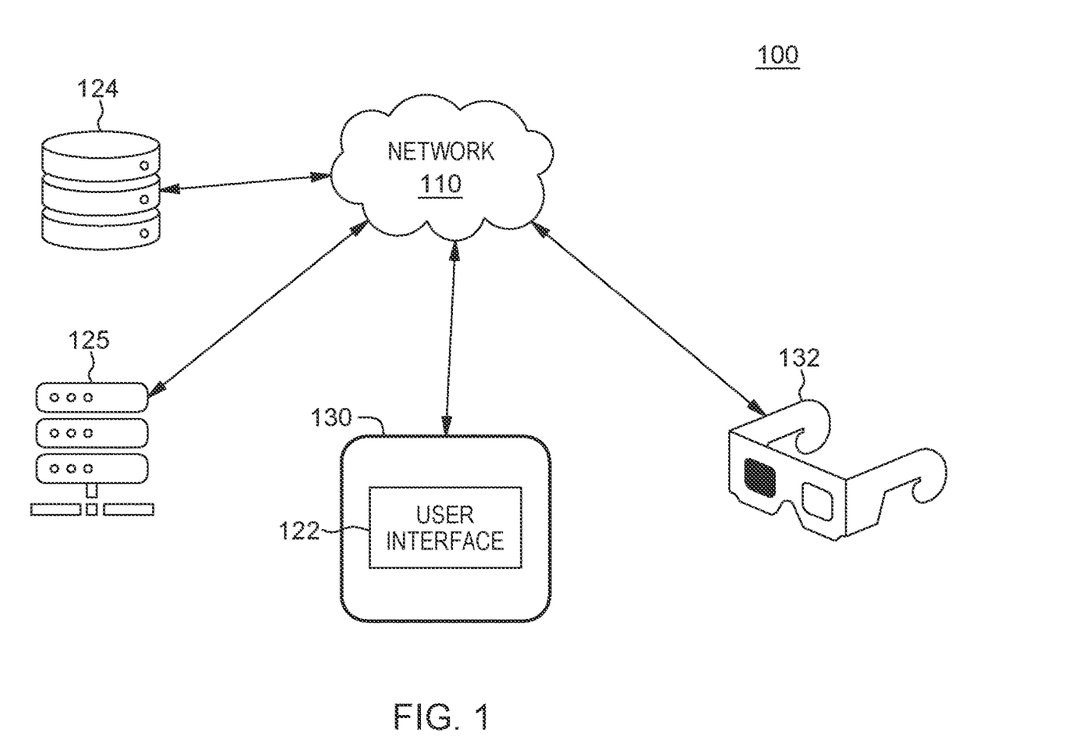
FIG. 1 depicts a functional block diagram illustrating a distributed data processing environment for synchronizing notifications across virtual reality environments and physical environments, in accordance with an embodiment of the present invention.

FIG. 1 depicts a functional block diagram illustrating a distributed data processing environment for synchronizing notifications across virtual reality environments and physical environments, generally designated 100, in accordance with one embodiment of the present invention. The term "distributed" as used herein describes a computer system that includes multiple, physically distinct devices that operate together as a single computer system.

FIG. 1 provides only an illustration of one embodiment of the present invention and does not imply any limitations with regard to the environments in which different embodiments may be implemented. As shown in FIG. 1, the distributed data processing environment 100 for synchronizing notifications across virtual reality environments and physical environments includes network 110 configured to facilitate communication between database 124, server 125, user device 130, and virtual reality headset 132.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between database 124, server 125, user device 130, and virtual reality headset 132. It is further understood that in some embodiments network 110 is optional and the distributed data processing environment 100 for synchronizing notifications across virtual reality environments and physical environments can operate as a stand-alone system, where in other embodiments, network 110 may be configured to enable user device 130 and/or virtual reality headset 132 to share a joint database using network 110.

User device 130 may be an electronic device configured for accompaniment with a user. User device 130 may be a personal electronic device such as a mobile communications device, smart phone, tablet, personal digital assistant, smart wearable device, personal laptop computer, desktop computer, or any other electronic device configured for user interaction and gathering user information to generate a user profile. In the depicted embodiment, user device 130 includes user interface 122 and sensor(s) (not shown). User device 130 may include components as described in further detail in FIG. 4.

User interface 122 operates as a local user interface on user device 130 through which one or more users of user device 130 interact with user device 130. In some embodiments, user interface 122 is a local app interface of a program (e.g., software configured to execute the steps of the invention described herein) on user device 130 or virtual reality headset 132. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to send and receive data (i.e., to and from the program via network 110, respectively). In an embodiment, user interface 122 enables a user to opt-in to the program, input user related data, and receive alerts to complete a task or activity.

Virtual reality headset 132 may be an electronic device configured to be a component configured to provide access to a VR environment. The electronic device may include a wireless sensor, software, actuators, and computer devices. Virtual reality headset 132 may be controlled from a remotely controlled system via network 110 or locally controlled system via a local network, or a combination of both. Further, virtual reality headset 132 may be configured to be controlled via a software application installed and executed by virtual reality headset 132 or user device 130. Virtual reality headset 132, when connected to a network, may convey usage data and other types of data corresponding to the device itself, or other devices connected via network 110, wherein the data may provide insights that are useful within the scope of the designed application. Virtual reality headset 132 may be configured with a processor, memory, and peripherals (not shown) to receive and process data. Virtual reality headset 132 may include components as described in further detail in FIG. 4.

In some embodiments, the user may wear special gloves, and/or utilize handheld controllers to perform operations in the VR environment in conjunction with virtual reality headset 132. Optionally, one or more wearable sensors may be utilized to obtain various data regarding the user as they operate in the virtual environment. This data can include, but is not limited to, positional data, biometric data, and/or ambient environmental data.

Database 124 may operate as a repository for data associated with server 125, user device 130, virtual reality headset 132, and other data transmitted within network 110. A database is an organized collection of data. Database 124 can be implemented with any type of storage device capable of storing data and configuration files that can be accessed and utilized by server 125, user device 130, and/or virtual reality headset 132, such as a database server, a hard disk drive, or a flash memory. In an embodiment, database 124 may be accessed by server 125, user device 130, and/or virtual reality headset 132 to store data associated with user device 130 or virtual reality headset 132. In another embodiment, database 124 may be accessed by user device 130 or virtual reality headset 132 to access data as described herein. In an embodiment, database 124 may reside independent of network 110. In another embodiment, database 124 may reside elsewhere within distributed data processing environment 100 provided database 124 has access to network 110.

In the depicted embodiment, server 125 may contain a program (i.e., software) configured to execute the steps of the invention described herein. In some embodiments, server 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with user devices 130 and virtual reality headset 132 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 4.

Figure 2:
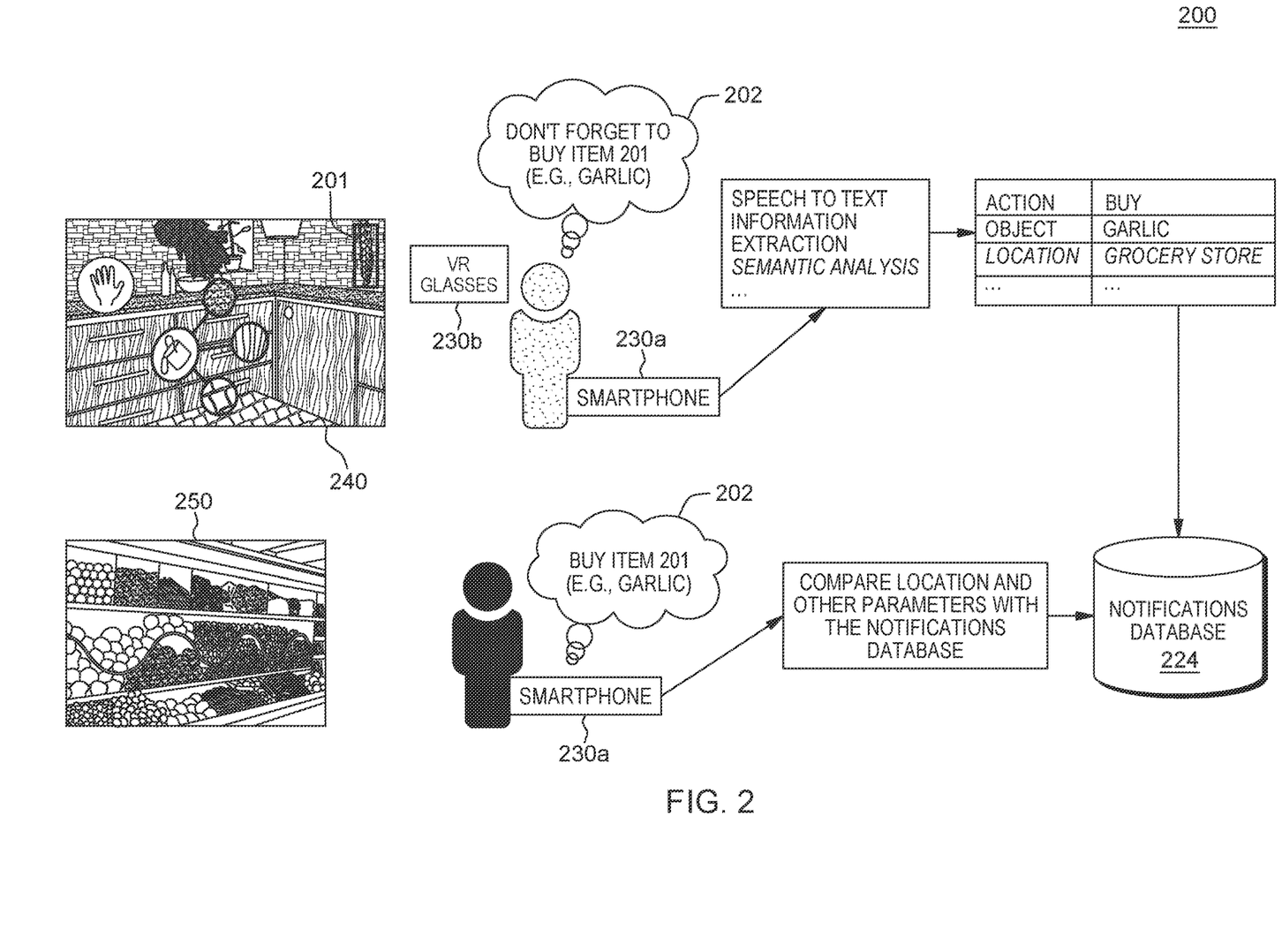
FIG. 2 depicts a flowchart of a system for synchronizing notifications across virtual reality environments and physical environments, in accordance with an embodiment of the present invention.

FIG. 2 depicts a flowchart of system 200 for synchronizing notifications across virtual reality environments and physical environments, in accordance with an embodiment of the present invention.

In an embodiment, system 200 may include one or more processors configured to receive user inputs 202 via a user interface of user device (e.g., smartphone 230a) associated with a user, wherein user inputs 202 may be processed to create or modify notification 203 (e.g., alert) in any of the virtual environments (e.g., virtual kitchen 240) or physical environments (e.g., grocery store 250) in which user device (e.g., smartphone 230a) is present. Notification 203 may then be synchronized among all the environments (e.g., virtual kitchen 240 and grocery store 250) and applied according to the conditions specified or determined at the time when user input 202 was used to create notification 203, or thereafter.

In an embodiment, system 200 may include one or more processors configured to detect one or more user devices (e.g., smartphone 230a and VR glasses 230b) associated with a user that is interacting within a VR environment. While interacting within the VR environment, a user interface may be generated or made available and configured to receive user inputs 202 to create one or more notifications 203 based on one or more selected conditions within the VR environment. The one or more processors may be configured to apply the notifications 203 according to the conditions specified or determined at the time user inputs 202 were received and processed to create notification 203, or at a later time while the user is either accessing a different VR environment, or in a physical environment. Once the notifications 203 are applied, the one or more processors may be configured to present the notifications 203 to be perceived by the user according to the conditions associated with the notifications 203.

VR glasses 230b may be an electronic computing device that provides virtual reality capability. It may include a virtual reality headset, mobile computing device (e.g., a smartphone, tablet computer, or other suitable computing device), laptop computer, desktop computer, and/or wearable computing device. In embodiments, a user uses VR glasses 230b to navigate a virtual environment (world) to perform a virtual action that is associated with a task that corresponds to a similar task in the physical world. Various biometric and/or environmental data is acquired during performance of the task. This data drives a product assessment in the virtual environment and enables an estimation of the performance of the product in a similar physical environment.

In an embodiment, system 200 may include one or more processors configured to receive user inputs 202 to create one or more notifications 203 based on one or more selected conditions within a physical environment, wherein the notification 203 may be presented to be detected by the user when the user is detected within one or more specific environments, and the one or more selected conditions are satisfied while in one or more of the specific environments.

In an embodiment, user inputs 202 may correspond to instructions to create notifications 203 for the user to receive or for other users to receive. In other words, the one or more processors may be configured to receive user inputs 202 from a first user to create one or more notifications 203 to be presented to a second user if the one or more conditions are satisfied while the second user is detected in a specific VR environment or a specific physical environment. Receiving user input 202 to create the notification 203 may include entry via text input, graphical user interface (GUI), speech-to-text, text-to-speech, or any other user data entry method as known to those of skill in the art.

In an embodiment, system 200 may include one or more processors configured to consider multiple factors when creating notification 203 and associating the specified conditions to trigger notification 203. For example, environment location, geo-fencing area, time, contextual situation, etc. may be considered when mapping or synchronizing notifications 203 and associated conditions to the one or more environments (e.g., VR environment and/or physical environment). Other VR environment parameters and physical environment parameters may be considered or embedded within the one or more environments to be used in determining whether or not to present the notification to the intended user. In an embodiment, the notification parameters (e.g., user location, user behavior, and/or timing information) may be continuously considered and compared to the notification parameters to determine if the conditions are satisfied to present notification 203 to the intended user. In an embodiment, notification parameters may also include the location and/or behavior of other users (e.g., users other than the user responsible for creating the notification) in determining when to present the notification to the intended user while in the environment (e.g., VR environment and/or physical environment).

In an embodiment, system 200 may include one or more processors configured to receive user inputs 202 from a user to create notifications 203 by receiving parameter inputs corresponding to conditions for presenting the notification 203. For example, a condition for presenting notification 203 may include determining if the user is within an environment corresponding to a store type or a specific geo-location, and then presenting notification 203 to the user. Another example of a condition for presenting notification 203 may include determining if a certain amount of time has elapsed, then presenting notification 203 to the user. Multiple conditions may be established to trigger presenting notification 203 to the user.

In an embodiment, system 200 may include one or more processors configured for converting user input 202 from speech to text using information extraction techniques and semantic analysis to process user input 202. User input 202 may include instructions to perform a task, wherein the task may be to purchase a specific item 201. In an embodiment, the item 201 may be a garlic string of multiple garlic bulbs, wherein item 201 may be identified via VR glasses 230b while user is browsing virtual kitchen 240. For example, if user input 202 includes the text "don't forget to buy garlic", then the one or more processors may be configured to identify the action to be performed as "buy", the object to be bought or purchased as "garlic" and the location to buy the garlic as "grocery store". The action, object, and location, as determined by performing information extraction and semantic analysis, may be stored in notifications database 224 for further processing and transmission.

In an embodiment, system 200 may include one or more processors configured for sending data corresponding to notification 203 to smartphone 230a for presenting to the user of smartphone 230a if the conditions set for presenting notification 203 are satisfied. Further, the one or more processors may be configured to compare location data and other parameters with the data corresponding to notification 203 to determine if and when notification 203 should be presented to user. For example, if conditions associated with notification 203 correspond to the user being within proximity of a physical environment corresponding to grocery store 250, then the one or more processors may be configured to present notification 203 to user once smartphone 230a has determined that the user is within the proximity of the physical environment corresponding to grocery store 250.

In an embodiment, notification 203 may be in any form that is perceptible to the user. For example, notification 203 may include an acoustic alert, a visual alert, a tactile alert, a message alert, or any combination thereof. Notification 203 may include specifications corresponding to multiple actions to be performed by one or more of the user devices (e.g., smartphone 230a, VR glasses 230b) associated with the user. Further, notification 203 may include specifications corresponding to multiple actions to be performed by one or more user devices not associated with the user (e.g., a second user device associated with the first user device, a second user device not associated with the first user).

In an embodiment, a first user may provide user input 202 to create notification 203 with a condition via a first user device (e.g., smartphone 230a, VR glasses 230b) that, when satisfied, may include one or more processors configured for presenting notification 203 to a second user associated with a second user device (not shown). For example, user input 202 to create notification 203 by the first user may trigger notification 203 to be presented by a second user device (not shown) to a second user to place a phone call or send a text message. A notification may also be created to include parameters or instructions about which environment to present the notification. For example, a user may provide a condition to only present the notification to the user or another user if the user or other user is in a specific environment determined by detecting the geo-location of the intended user. Notification parameters may also include information about which specific users should receive the notification based on those users' permissions, which environment in which to receive the notification, and timing parameters of when the notification should be presented.

In an embodiment, system 200 may include one or more processors configured to receive user inputs 202 to create one or more notifications 203 based on one or more selected conditions when not within a physical environment, wherein notification 203 may be presented to the user even when the user is not detected within a specific VR environment, and the one or more selected conditions are satisfied even while not in a specific VR environment.

In an embodiment, system 200 may include one or more processors configured to synchronize (e.g., map) the one or more notifications 203 with one or more environments (e.g., VR environment and/or physical environment) based on the one or more conditions specified by the user or determined by the one or more processors.

Once the one or more notifications 203 are synchronized or successfully mapped to the one or more environments, the one or more processors may be configured to determine if a user is detected in the one or more environments and present the one or more notifications 203 to the intended user if the one or more conditions associated with the one or more notifications 203 is satisfied.

In an embodiment, a user associated with one or more user devices (e.g., smartphone 230a, VR glasses 230b) may be in a store browsing products while wearing VR glasses 230b coupled with smartphone 230a. As the user is navigating content in the store, system 200 may be configured to detect, through the one or more user devices, the user purchasing a first product and looking at a second product. The one or more processors may be configured to analyze the user's shopping behavior (e.g., purchasing the first product and looking at the second product) and create notification 203 to alert the user about the second product based on one or more conditions that may be set by the user, or determined by the one or more processors, based on the one or more environment parameters corresponding to the current user environment and/or a later user environment.

In another embodiment, system 200 may include one or more processors configured for executing instructions on a computing device (e.g., smartphone 230a, VR glasses 230b) to maintain a mapping between a physical environment and a virtual environment by analyzing the contextual parameters and situation in the physical environment and the VR environment. For example, while a user is navigating a VR environment (e.g., virtual kitchen 240) equipped with a VR user device (e.g., VR glasses 230b), the VR user device may be configured to analyze VR content present in the VR environment to identify a virtual geo-location (e.g., virtual coordinates) of the user. Further, while a user is navigating a VR environment (e.g., virtual kitchen 240) equipped with a VR user device (e.g., VR glasses 230b), the VR device (e.g., VR glasses 230b) may be configured to identify virtual context location of the user, such as a shopping center, train station, or other points of interest and accessible to the user. Further, while a user is navigating a VR environment equipped with a VR user device, the VR device may be configured to identify or detect the presence of other users present in the physical or VR environment.

Figure 3:
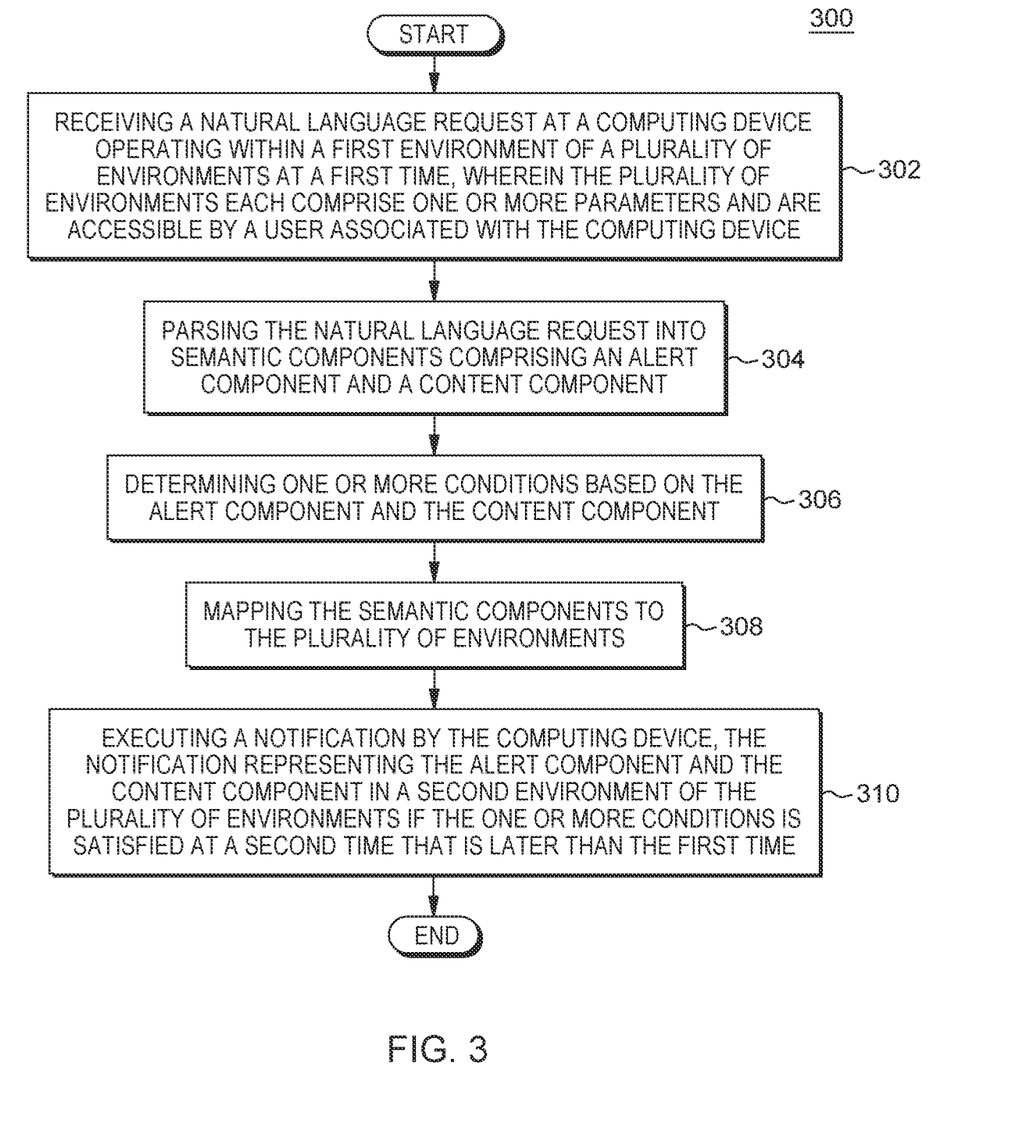
FIG. 3 depicts a flowchart of a method for synchronizing notifications across virtual reality environments and physical environments, in accordance with an embodiment of the present invention.

FIG. 3 depicts a flowchart of a computer-implemented method 300 for synchronizing notifications across virtual reality environments and physical environments, in accordance with an embodiment of the present invention.

In an embodiment, computer-implemented method 300 may include one or more processors configured for receiving 302 a natural language request at a computing device operating within a first environment of a plurality of environments at a first time, wherein at least one of the plurality of environments is a VR environment. For example, the natural language request may correspond to user input in the form of text data, audio input, or other user data intended as user input to the computing device. The audio input may include speech utterances that may be converted to audio data via the one or more processors. The audio data may be analyzed for phenomes and converted to text for further processing. In some embodiments, the natural language processing may be performed onboard a user device (e.g., user device 130) and server 125 of FIG. 1. In other embodiments, all or some of the natural language processing may be performed on a remote computer.

In an embodiment, the audio data may be analyzed using a natural language processing (NLP) system, such as a machine learning system. Machine learning system may be used to further categorize and classify input data including biometric data acquired from sensors, image data, scenery, object recognition and/or object classification, person recognition, natural language processing (NLP), sentiment analysis, and/or other classification processes. Machine learning system may include one or more neural networks, convolutional neural networks (CNNs), and/or other deep learning techniques. The machine learning system may include regression algorithms, classification algorithms, clustering techniques, anomaly detection techniques, Bayesian filtering, and/or other suitable techniques to analyze the information obtained by the one or more processors to assist in categorizing the information.

In an embodiment, computer-implemented method 300 may include one or more processors configured for parsing 304 the natural language request into semantic components comprising an alert component and a content component.

For example, parsing 304 the natural language request into semantic components may include converting the natural language request to text data using semantic analysis. Further, parsing 304 the natural language request may include identifying text corresponding to an action as the alert component and identifying text corresponding to an object and/or location as the content component.

In an embodiment, computer-implemented method 300 may include one or more processors configured for identifying the alert component in the natural language request as a device command or action instructing the computing device to generate the notification.

In an embodiment, computer-implemented method 300 may include one or more processors configured for identifying the content component in the natural language request as a user command instructing a user to perform a task.

In an embodiment, computer-implemented method 300 may include one or more processors configured for determining 306 one or more conditions based on the alert component and the content component. In an embodiment, the one or more conditions may include one or more of a geographical condition corresponding to a location, an activity condition corresponding to a user event, and a user condition determined based on the content component. A user event may include user activity corresponding to a natural human act performed at a particular time and/or location. For example, a user event may include a user walking into a grocery store, driving past a retail store or jogging past an apparel store. The user event may be determined by the one or more processors by processing data gathered by sensors in communication with a computing device associated with the user.

In an embodiment, computer-implemented method 300 may include one or more processors configured for mapping 308 the semantic components to the plurality of environments.

In an embodiment, computer-implemented method 300 may include one or more processors configured for executing 310 a notification by the computing device, the notification representing the alert component and the content component in a second environment of the plurality of environments if the one or more conditions is satisfied at a second time that is later than the first time.

In an embodiment, the first environment may include a virtual reality environment and the second environment may include a physical environment.

In an embodiment, the notification may be one or more of an audible alert and a visual alert representing the content component.

Figure 4:
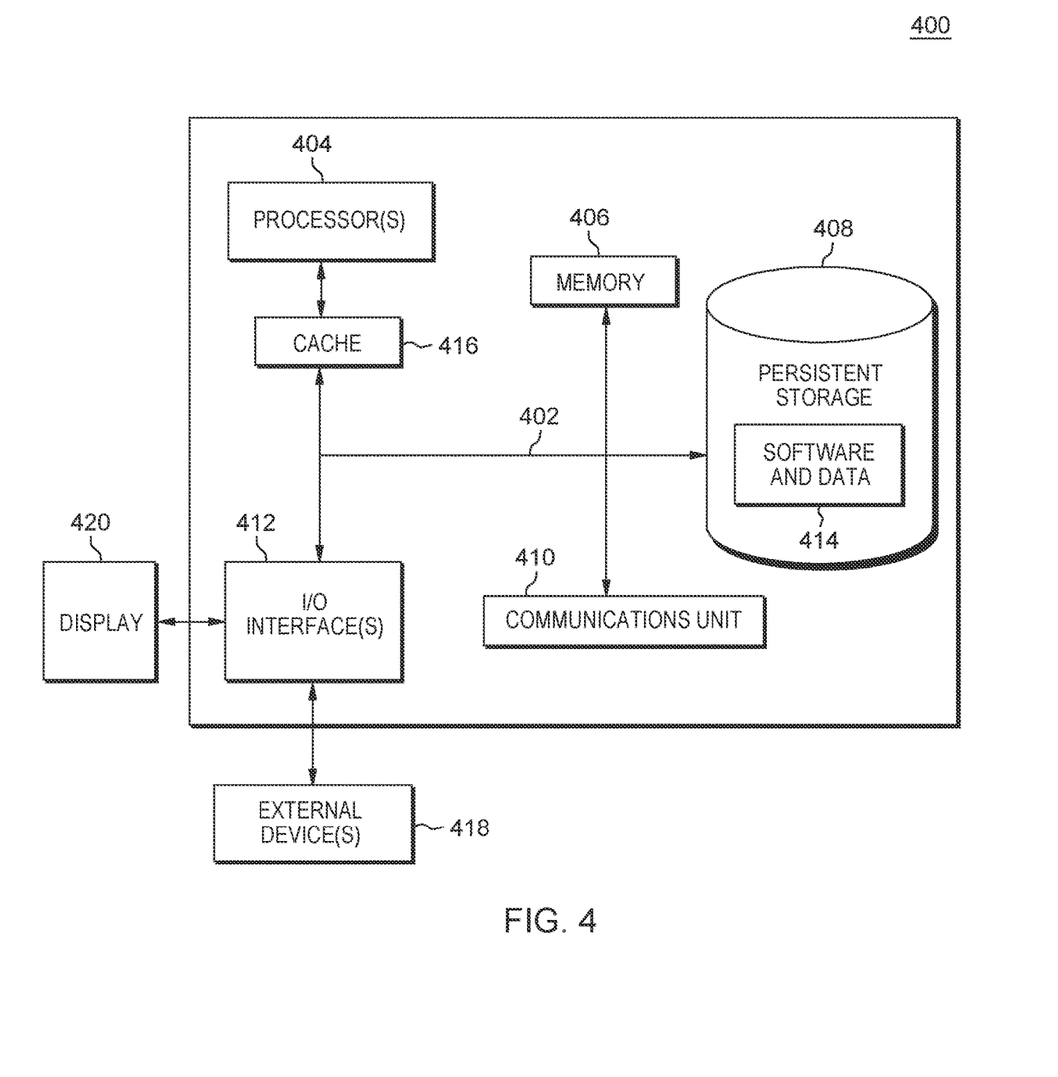
FIG. 4 depicts a block diagram of a computing device of distributed data processing environment of FIG. 1, in accordance with an embodiment of the present invention.

FIG. 4 depicts a block diagram of computing device 400 of distributed data processing environment 100 of FIG. 1, such as server 125, user device 130, and/or virtual reality headset 132, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software and data 414 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 414 may be downloaded to persistent storage 408 through communications unit 410.

I/O interface(s) 412 allows for input and output of data with other devices that may be connected to database 124, server 125, user device 130, and/or virtual reality headset 132. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for synchronizing notifications across virtual reality environments and physical environments, the computer-implemented method comprising:
receiving, by one or more processors, a natural language request at a computing device operating within a virtual reality environment of a plurality of environments at a first time, wherein the plurality of environments each comprise one or more parameters and the plurality of environments are accessible by a user associated with the computing device;
parsing, by the one or more processors, the natural language request into semantic components comprising an alert component and a content component;
determining, by the one or more processors, one or more conditions based on the alert component and the content component;
creating, by the one or more processors, a first mapping of the semantic components to the plurality of environments;
executing, by the one or more processors, a notification by the computing device, the notification representing the alert component and the content component in a physical environment of the plurality of environments if the one or more conditions is satisfied at a second time that is later than the first time; and
maintaining, by the one or more processors, a second mapping between the physical environment and the virtual reality environment by analyzing contextual parameters and situations in the physical environment and the virtual reality environment.

2. The computer-implemented method of claim 1, further comprising:
converting, by the one or more processors, the natural language request to text data using semantic analysis.

3. The computer-implemented method of claim 1, further comprising:
identifying, by the one or more processors, the alert component in the natural language request as a device command instructing the computing device to generate the notification.

4. The computer-implemented method of claim 1, further comprising:
identifying, by the one or more processors, the content component in the natural language request as a user command instructing a user to perform a task.

5. The computer-implemented method of claim 1, wherein the one or more conditions includes one or more of a geographical condition corresponding to a location, an activity condition corresponding to a user event, and a user condition determined based on the content component.

6. The computer-implemented method of claim 1, wherein the notification is one or more of an audible alert and a visual alert representing the content component and is presented to the user via VR goggles communicably coupled with the computing device.

7. A computer program product for synchronizing notifications across virtual reality environments and physical environments, the computer program product comprising:
one or more computer readable storage media and program instructions collectively stored on the one or more computer readable storage media, the stored program instructions comprising:
program instructions to receive a natural language request at a computing device operating within a virtual reality environment of a plurality of environments at a first time, wherein the plurality of environments each comprise one or more parameters and the plurality of environments are accessible by a user associated with the computing device;
program instructions to parse the natural language request into semantic components comprising an alert component and a content component; program instructions to determine one or more conditions based on the alert component and the content component;
program instructions to create a first mapping of the semantic components to the plurality of environments;
program instructions to execute a notification by the computing device, the notification representing the alert component and the content component in a physical environment of the plurality of environments if the one or more conditions is satisfied at a second time that is later than the first time; and
program instructions to maintain a second mapping between the physical environment and the virtual reality environment by analyzing contextual parameters and situations in the physical environment and the virtual reality environment.

8. The computer program product of claim 7, further comprising:
program instructions to convert the natural language request to text data using semantic analysis.

9. The computer program product of claim 7, further comprising:
program instructions to identify the alert component in the natural language request as a device command instructing the computing device to generate the notification.

10. The computer program product of claim 7, further comprising:
program instructions to identify the content component in the natural language request as a user command instructing a user to perform a task.

11. The computer program product of claim 7, wherein the one or more conditions includes one or more of a geographical condition corresponding to a location, an activity condition corresponding to a user event, and a user condition determined based on the content component.

12. The computer program product of claim 7, wherein the notification is one or more of an audible alert and a visual alert representing the content component and is presented to the user via VR goggles communicably coupled with the computing device.

13. A computer system for synchronizing notifications across virtual reality environments and physical environments, the computer system comprising:
one or more computer processors;
one or more computer readable storage media; and
program instructions collectively stored on the one or more computer readable storage media for execution by at least one of the one or more computer processors, the stored program instructions comprising:
program instructions to receive a natural language request at a computing device operating within a virtual reality environment of a plurality of environments at a first time, wherein the plurality of environments each comprise one or more parameters and the plurality of environments are accessible by a user associated with the computing device,
program instructions to parse the natural language request into semantic components comprising an alert component and a content component; program instructions to determine one or more conditions based on the alert component and the content component, program instructions to map create a first mapping of the semantic components to the plurality of environments, program instructions to execute a notification by the computing device, the notification representing the alert component and the content component in a physical environment of the plurality of environments if the one or more conditions is satisfied at a second time that is later than the first time, and program instructions to maintain a second mapping between the physical environment and the virtual reality environment by analyzing contextual parameters and situations in the physical environment and the virtual reality environment.

14. The computer system of claim 13, further comprising:
program instructions to convert the natural language request to text data using semantic analysis.

15. The computer system of claim 13, further comprising:
program instructions to identify the alert component in the natural language request as a device command instructing the computing device to generate the notification; and program instructions to identify the content component in the natural language request as a user command instructing a user to perform a task.

16. The computer system of claim 13, wherein the one or more conditions includes one or more of a geographical condition corresponding to a location, an activity condition corresponding to a user event, and a user condition determined based on the content component.

17. The computer system of claim 13, wherein the notification is one or more of an audible alert and a visual alert representing the content component and is presented to the user via VR goggles communicably coupled with the computing device.

* * * * *